US012715740B2

(12) United States Patent
De Ciccio et al.

(10) Patent No.: US 12,715,740 B2
(45) Date of Patent: Aug. 25, 2026

(54) SYSTEM FOR DETECTING AN ENTITY IN THE VICINITY OF A DRILLING MACHINE, AND CORRESPONDING METHOD

(71) Applicant: MBI PRODUITS DE FORAGE INC., Rouyn-Noranda (CA)

(72) Inventors: Pietro De Ciccio, Rouyn-Noranda (CA); Alain Beauchesne, Rouyn-Noranda (CA); Philippe Laplante, Rouyn-Noranda (CA)

(73) Assignee: MBI PRODUITS DE FORAGE INC., Rouyn-Noranda (CA)

( * ) Notice: Subject to any disclaimer, the term of this patent is extended or adjusted under 35 U.S.C. 154(b) by 336 days.

(21) Appl. No.: 18/280,602

(22) PCT Filed: Mar. 4, 2022

(86) PCT No.: PCT/CA2022/050313
§ 371 (c)(1),
(2) Date: Sep. 6, 2023

(87) PCT Pub. No.: WO2022/187937
PCT Pub. Date: Sep. 15, 2022

(65) Prior Publication Data

US 2024/0151119 A1 May 9, 2024

Related U.S. Application Data

(60) Provisional application No. 63/157,653, filed on Mar. 6, 2021.

(51) Int. Cl.
*G08B 21/22* (2006.01)
*B66C 1/44* (2006.01)
(Continued)

(52) U.S. Cl.
CPC ................ *B66C 1/447* (2013.01); *B66C 1/58* (2013.01); *B66C 23/72* (2013.01);
(Continued)

(58) Field of Classification Search
CPC ............................ E21B 41/0021; G08B 21/22
See application file for complete search history.

(56) References Cited

U.S. PATENT DOCUMENTS

2015/0049911 A1* 2/2015 Doettling ............... G08B 21/22
382/103
2016/0232771 A1* 8/2016 Mendiola ............... G08B 21/22
(Continued)

FOREIGN PATENT DOCUMENTS

EP 1242710 A2 9/2002
EP 2952671 A1 12/2015
(Continued)

OTHER PUBLICATIONS

International Search Report of PCT Application No. PCT/CA2022/050313 dated May 18, 2022.
(Continued)

*Primary Examiner* — Mark A Connolly
(74) *Attorney, Agent, or Firm* — AVEK IP, LLC

(57) ABSTRACT

A system and associated method for detecting an entity in a detection area surrounding a drilling machine is provided. The detection area is being divided into a plurality of subzones, with each of said plurality of subzones being associated with a corresponding safety level. The system comprises at least one optical scanner optically covering the detection area and operable to capture the entity within the detection area; a controlling device, operatively connected with the at least one optical scanner, the controlling device is configured to: determine a position of the entity captured by the at least one optical scanner within at least one of the
(Continued)

plurality of subzones of the detection area; and trigger at least one action signal based on the safety level of the subzone corresponding to the determined position of the entity.

18 Claims, 11 Drawing Sheets

(51) Int. Cl.

| | |
|---|---|
| ***B66C 1/58*** | (2006.01) |
| ***B66C 23/72*** | (2006.01) |
| ***E21B 41/00*** | (2006.01) |
| ***G01V 8/10*** | (2006.01) |
| *E21B 15/04* | (2006.01) |
| *E21B 19/14* | (2006.01) |

(52) U.S. Cl.

CPC ............ *E21B 41/0021* (2013.01); *G01V 8/10* (2013.01); *G08B 21/22* (2013.01); *E21B 15/04* (2013.01); *E21B 19/14* (2013.01)

(56) References Cited

U.S. PATENT DOCUMENTS

| | | | | |
|---|---|---|---|---|
| 2020/0061823 | A1 | 2/2020 | Nguyen et al. | |
| 2020/0380178 | A1* | 12/2020 | Santarone | G01S 3/48 |
| 2021/0102454 | A1* | 4/2021 | Jorud | G06Q 50/265 |
| 2021/0383602 | A1* | 12/2021 | Graham | G06T 17/05 |

FOREIGN PATENT DOCUMENTS

| | | | | |
|---|---|---|---|---|
| WO | 2019231798 | A1 | 12/2019 | |
| WO | WO-2022003589 | A1 * | 1/2022 | G06V 20/52 |
| WO | 2022187937 | A1 | 9/2022 | |

OTHER PUBLICATIONS

International Search Report, dated May 18, 2022, issued in International Application PCT/CA2022/050313, 2 pages.

* cited by examiner

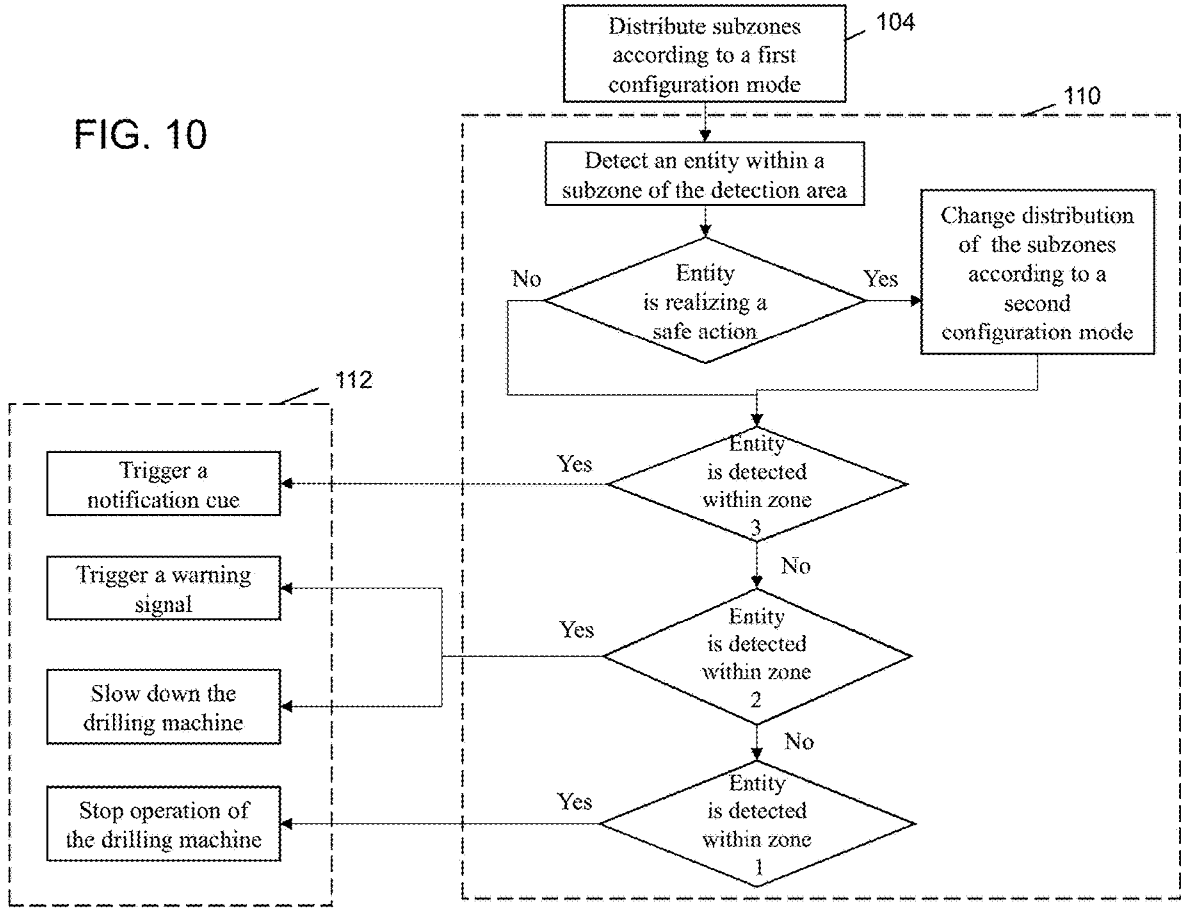
FIG. 10
Distribute subzones according to a first configuration mode
104
110
Detect an entity within a subzone of the detection area
Entity is realizing a safe action
No
Yes
Change distribution of the subzones according to a second configuration mode
112
Entity is detected within zone 3
Yes
Trigger a notification cue
No
Trigger a warning signal
Entity is detected within zone 2
Yes
Slow down the drilling machine
No
Entity is detected within zone 1
Yes
Stop operation of the drilling machine

SYSTEM FOR DETECTING AN ENTITY IN THE VICINITY OF A DRILLING MACHINE, AND CORRESPONDING METHOD

PRIOR APPLICATION

The present application claims priority from U.S. provisional patent application No. 63/157,653, filed on Mar. 6, 2021, and entitled "ROD HANDLER AND SECURITY SYSTEM AND METHOD FOR GROUND DRILLING MACHINE", the disclosure of which being hereby incorporated by reference in its entirety.

TECHNICAL FIELD

The technical field relates to detection system security systems to detect an entity in a given area, and more particularly to an entity detection system capable of detecting an entity within a detection area surrounding a drilling machine, and to corresponding methods.

BACKGROUND OF THE INVENTION

Ground exploration in the mining industry comprises drilling holes in the ground and retrieving ground samples which may, relevantly, include mineral core samples that will be evaluated to determine the mineral composition thereof. These mineral samples can then be studied and evaluated to identify their mineral composition to determine if mining operations will take place where the mineral sample was retrieved. This type of exploration drilling is also called core drilling.

In order to operate these drilling machines, a worker is often required to insert numerous heavy drill rods made of metal. To do so, the machines must be stopped each time a worker has to insert a new drill rod. This method results in constant machine downtime and generates considerable loss of productivity and time.

In addition, the environment surrounding the drilling machine can be dangerous for workers proximate the drilling machine, for instance in case they would get caught by one of the rotating drill rods or any other part of the drilling machine. In particular, if a worker is in the vicinity of the machine when it is in operation, an accident may occur and result in serious injury or worse to the worker. Unfortunately, conventional systems do not allow to adapt the safety level according to the position of a worker and are not designed to react accordingly in a fast and adequate way.

In view of the above, there is a need for a security system which would be able to overcome or at least minimize some of the above-discussed prior art concerns.

BRIEF SUMMARY

It is therefore an aim of the present invention to at least partially address the above-mentioned issues.

According to a general aspect, there is provided a system for detecting an entity in a detection area surrounding at least partially a drilling machine. The detection area being divided into a plurality of subzones, each of said plurality of subzones being associated with a corresponding safety level. The system comprises at least one optical scanner optically covering the detection area and operable to capture the entity within the detection area; a controlling device, operatively connected with the at least one optical scanner. The controlling device may be configured to: determine a position of the entity captured by the at least one optical scanner within at least one of the plurality of subzones of the detection area; and trigger at least one action signal based on the safety level of the subzone corresponding to the determined position of the entity.

According to possible embodiments of the system, the controlling device may further be configured to set up the system into a detection mode corresponding to the division of the detection area into the plurality of subzones with the corresponding associated safety levels. The plurality of subzones comprises at least a first subzone corresponding to a high-risk zone; a second subzone corresponding to a medium-risk zone; and a third subzone corresponding to a low-risk zone. Further at least one action signal triggered by the controlling device may comprises at least one of a drilling machine deceleration command, a drilling machine stop command, refraining from triggering a command to the drilling machine and a drilling machine start command.

According to other possible embodiments, the system may further comprise an authorized presence detection assembly configured to detect an authorized action realized by the entity in the vicinity of the drilling machine and operatively coupled to the controlling device. The controlling device may further be configured to set up the system into an intervention mode different from the detection mode, when the authorized action is detected by the authorized presence detection assembly. Accordingly, the intervention mode may correspond to an intervention division of the detection area into a plurality of subzones different from the division of the detection area in the detection mode.

According to another possible embodiment of the system, the detection area may comprise an intervention sub-area and wherein the intervention sub-area when the system is in the intervention mode has a lower safety level than when the system is in the detection mode. The authorized presence detection assembly may comprise sensors configured to send a signal to the controlling device when the entity is realizing the authorized action. The authorized action may comprise the entity manipulating a drill rod handler in the vicinity of the drilling machine. The drill rod handler may further comprise a handlebar with at least one hand contact sensor, the at least one hand contact sensor being operatively connected to the controlling device and configured to notify the controlling device that the authorized action is being realized by the entity. Accordingly, the detected entity may at least partially be positioned within the intervention sub-area when manipulating the drill rod handler.

According to another general aspect, there is provided a system for detecting an entity in a detection area adjacent a drilling machine. The detection area being divided into a plurality of subzones, each of said plurality of subzones being associated with a corresponding safety level. The system comprises a detecting device optically covering the detection area and operable to capture the entity within the detection area; a controlling device, operatively connected with the detecting device. The controlling device may be configured to determine a position of the entity captured by the detecting device within at least one of the plurality of subzones of the detection area; and trigger at least one action signal based on the safety level of the subzone corresponding to the determined position of the entity.

According to an embodiment of the system, the detection area optically covered by the detection device covers a peripheral region at least one of surrounding and extending above the drilling machine.

According to another embodiment, the system further comprise an authorized presence detection assembly configured to detect an authorized action realized by the entity in the vicinity of the drilling machine and operatively coupled to the controlling device. The authorized presence detection assembly may comprise sensors configured to send a signal to the controlling device when the entity is realizing the authorized action. The authorized action may comprise the entity manipulating a drill rod handler in the vicinity of the drilling machine.

According to another embodiment of the system, the controlling device may be configured to set up the system into a detection mode corresponding to the division of the detection area into the plurality of subzones with the corresponding associated safety levels. The controlling device may further be configured to set up the system into an intervention mode different from the detection mode, when the authorized action is detected by the authorized presence detection assembly. The intervention mode may correspond to an intervention division of the detection area into a plurality of subzones different from the division of the detection area in the detection mode.

According to another embodiment of the system, the detection area may comprise an intervention sub-area and wherein the intervention sub-area when the system is in the intervention mode has a lower safety level than when the system is in the detection mode. The detection device may comprise a plurality of optical scanners, each optical scanner being configured to optically cover an area coverage portion of the detection area.

According to another embodiment of the system, the area covering portion of each of the plurality of optical scanners may have a covering portion sector angle centered in or proximate the drilling machine. The at least two of said plurality of optical scanners may be spaced from each other from a scanner separation distance greater than 1 m. The at least one action signal may comprise at least one of a drilling machine deceleration command, a drilling machine stop command and a drilling machine start command.

According to another embodiment of the system, the controlling device may be configured to transmit the at least one action signal to the drilling machine. A signalling device may be operatively connected to the controlling device, the signalling device being configured to notify the presence of the detected entity in the detection area.

According to yet another general aspect, there is provided a method for detecting an entity in a detection area surrounding at least partially a drilling machine. The detection area being divided into a plurality of subzones, each of said plurality of subzones being associated with a corresponding safety level. The method may comprise optically covering the detection area via at least one optical scanner; capturing by the at least one optical scanner the entity within the detection area; determining a position of the entity within at least one of the plurality of subzones of the detection area; and triggering at least one action signal based on the safety level of the subzone in which the entity is detected.

According to possible embodiments, the method may comprise setting up a detection mode corresponding to the division of the detection area into the plurality of subzones and associating each one of the plurality of subzones with the corresponding safety levels. The plurality of subzones may comprise at least a first subzone corresponding to a high-risk zone; a second subzone corresponding to a medium-risk zone; and a third subzone corresponding to a low-risk zone.

According to other possible embodiments of the method, triggering the at least one action signal may comprise at least one of decelerating the drilling machine, stopping the drilling machine, refraining from triggering a command for the drilling machine, and starting the drilling machine. Accordingly, the drilling machine may be decelerated when the entity is detected in the second subzone; the command may be refrained from being triggered and/or the drilling machine may be started when the entity is detected in the third subzone; the drilling machine is stopped when the entity is detected in the first subzone.

According to another possible embodiment, the method may further comprise detecting an authorized action realized by the entity in the vicinity of the drilling machine and may also comprise setting up an intervention mode different from the detection mode, when detecting the authorized action realized by the entity. The intervention mode may correspond to an intervention division of the detection area into a plurality of subzones different from the division of the detection area in the detection mode. The detection area may comprise an intervention sub-area and wherein in the intervention mode the intervention sub-area has a lower safety level than in the detection-mode. The authorized action may also comprise the entity manipulating a drill rod handler in the vicinity of the drilling machine. The detected entity may further be at least partially positioned within the intervention sub-area when manipulating the drill rod handler.

According to other aspects of the method, prior to optically covering the detection area via said at least one optical scanner, the method may further comprise scanning an area surrounding at least partially the drilling machine and determining dimensions and/or boundaries of the detection area within the scanned area.

According to another aspect of the method, prior to optically covering the detection area via said at least one optical scanner, the method may further comprise dividing the detection area into the plurality of subzones and associating the corresponding safety level to each subzone of the plurality of subzones. Associating the corresponding safety level to each subzone of the plurality of subzones may be based on a distance of each subzone relative to the drilling machine.

BRIEF DESCRIPTION OF THE DRAWINGS

FIG. 10 is a diagram summarizing an example of operation of the entity detection system.

DETAILED DESCRIPTION OF THE EMBODIMENTS

Figure 1:
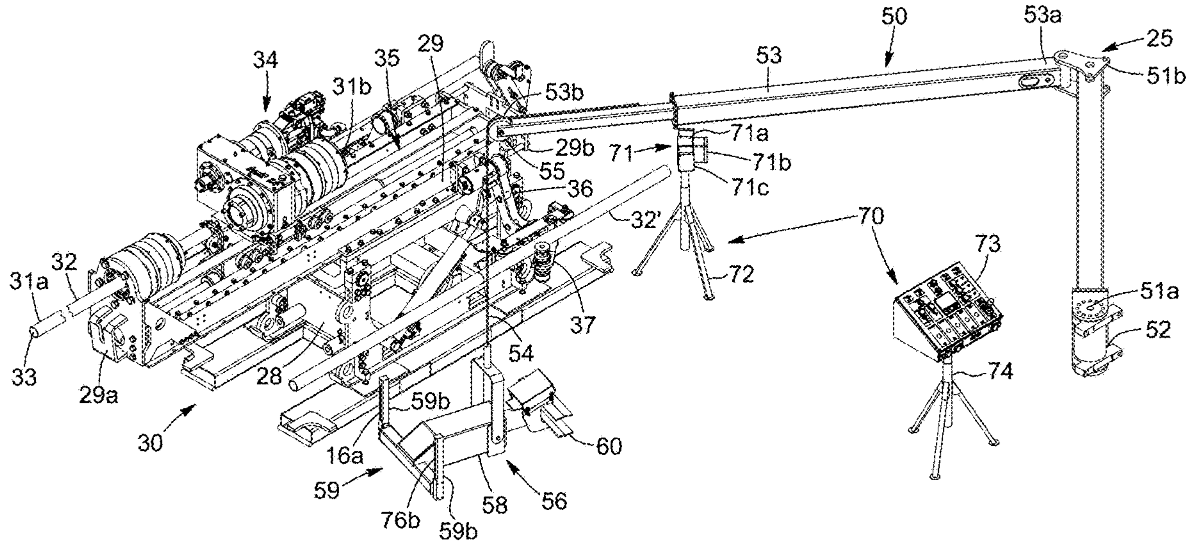
FIGS. 1-3 are top perspective views of a drilling machine and an entity detection system for detecting an entity in a detection area surrounding at least partially the drilling machine, sequentially showing the retrieval of a drill rod from the drilling machine with a rod handler and a drill rod carrying device, a post and boom of the drill rod carrying device being removed in FIG. 2.

In the following description, the same numerical references refer to similar elements. Furthermore, for the sake of simplicity and clarity, namely so as to not unduly burden the figures with several references numbers, not all figures contain references to all the components and features, and references to some components and features may be found in only one figure, and components and features of the present disclosure which are illustrated in other figures can be easily inferred therefrom. The embodiments, geometrical configurations, materials mentioned and/or dimensions shown in the figures are optional, and are given for exemplification purposes only.

Moreover, it will be appreciated that positional descriptions such as "above", "below", "forward", "rearward", "left", "right" and the like should, unless otherwise indicated, be taken in the context of the figures only and should not be considered limiting. Moreover, the figures are meant to be illustrative of certain characteristics of the drilling machine and the entity detection system and are not necessarily to scale.

To provide a more concise description, some of the quantitative expressions given herein may be qualified with the term "about". It is understood that whether the term "about" is used explicitly or not, every quantity given herein is meant to refer to an actual given value, and it is also meant to refer to the approximation to such given value that would reasonably be inferred based on the ordinary skill in the art, including approximations due to the experimental and/or measurement conditions for such given value.

In the following description, an embodiment is an example or implementation. The various appearances of "one embodiment", "an embodiment" or "some embodiments" do not necessarily all refer to the same embodiments. Although various features may be described in the context of a single embodiment, the features may also be provided separately or in any suitable combination. Conversely, although the invention may be described herein in the context of separate embodiments for clarity, it may also be implemented in a single embodiment. Reference in the specification to "some embodiments", "an embodiment", "one embodiment" or "other embodiments" means that a particular feature, structure, or characteristic described in connection with the embodiments is included in at least some embodiments, but not necessarily all embodiments.

It is to be understood that the phraseology and terminology employed herein is not to be construed as limiting and are for descriptive purpose only. The principles and uses of the teachings of the present disclosure may be better understood with reference to the accompanying description, figures and examples. It is to be understood that the details set forth herein do not construe a limitation to an application of the disclosure.

Furthermore, it is to be understood that the disclosure can be carried out or practiced in various ways and that the disclosure can be implemented in embodiments other than the ones outlined in the description above. It is to be understood that the terms "including", "comprising", and grammatical variants thereof do not preclude the addition of one or more components, features, steps, or integers or groups thereof and that the terms are to be construed as specifying components, features, steps or integers. If the specification or claims refer to "an additional" element, that does not preclude there being more than one of the additional elements. It is to be understood that where the claims or specification refer to "a" or "an" element, such reference does not construe a limitation to only one of that element. It is to be understood that where the specification states that a component, feature, structure, or characteristic "may", "might", "can" or "could" be included, that particular component, feature, structure, or characteristic is not required to be included.

The descriptions, examples, methods and materials presented in the claims and the specification are not to be construed as limiting but rather as illustrative only. Meanings of technical and scientific terms used herein are to be commonly understood as by one of ordinary skill in the art to which the invention belongs, unless otherwise defined. It will be appreciated that the methods described herein may be performed in the described order, or in any suitable order.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

Long-reach drilling machines are specifically used to explore the ground for specific mineral formations at important depths below the ground surface, or below the surface of a mine shaft. This exploration is accomplished by drilling very long boreholes that can be up to about 3500 meters long (about 11 483 feet long) to extract in-depth core mineral samples.

To drill the borehole, specialized drilling machines 30, an example of which is represented in FIGS. 1 to 4, are used that allow a hollow drill string 31 composed of end-to-end drill rods 32 to be formed and put into rotation. The end of the drill string 31 that engages the ground is equipped with a core bit 33, which is a ring-shaped bit that is typically composed of a metal matrix to which is added tungsten or tungsten carbide powder and which is impregnated with diamonds fragments, to obtain the necessary hardness to cut through the rock. The core bit 33 is also often called the diamond drill bit 33. The drill bit cuts the core sample out of the rock by rotating at high speed and with a certain amount of pressure being forced on the ground. This core bit is attached to a reaming shell (not represented) that reams the hole to the desired diameter size. The reaming shell may also be impregnated with diamonds or tungsten carbide. The reaming shell also helps to stabilize the core bit drilling process.

The reaming shell is attached to a wireline core barrel (not represented), the part of the equipment that will collect the core sample. A wireline core barrel includes two components: an inner tube assembly and an outer tube assembly. While the outer tube assembly rotates with the drill rods, the inner tube assembly does not rotate. The inner tube assembly includes a core tube which is the piece that will actually hold the core sample during the drilling process. The core tube has at its first end a core case assembly, through which the core sample is received and that allows it to be retained within the core tube; and its second end a head assembly that closes the core tube second end. The wireline core barrel is connected to a drill head 34 of the drilling machine 30 by the drill rods 32. The deeper the bore hole, the more drill rods are needed. Drill rods 32 transfer the torque, feed, force and rotation speed required to drill into the rock, from the drill head to the drill bit. A pressure pump is used to pump drilling fluids into the drill string 31. The fluids will flush the rock cuttings away from the bit and carry them to the surface and will cool the bit at the same time.

Core samples are retrieved from the core barrel as drill rods are added to drill deeper into the ground. The core samples are extracted within the above-mentioned core tube. To accomplish this, the core tube is first conveyed while the drill string 31 does not rotate through the drill string all the way down the bore hole, with gravity in the case of a downhole, or with water that is pumped inside the hallow drill rods to push the core tube in the case of an up-hole or an insufficiently downwardly inclined hole, until the core tube locks into the core barrel. As the drill string 31 rotates to drill the ground, the core barrel will slide over the core sample as it is cut and the core sample will fill the core tube. When the core tube is full, the drilling is interrupted. An overshot attached to the end of a winch cable is inserted inside the drill string, conveyed by gravity or pushed by pumped water, and locks onto the head assembly, or back-end, that is attached to the core tube. The winch is retracted, pulling the core tube to the surface. The core sample does not drop out from inside the core tube due to the above-mentioned core case assembly and head assembly that plug both extremities of the core tube.

The core tube is pulled out through the drill string with the winch cable, until it reaches a retrieval position where one of its extremities slightly protrudes through the drill string 31. The overshot is removed from the head assembly, and the head assembly is removed from the inner tube. The core tube is then manually grasped and pulled out of the drill head 34. The core sample is removed from the core tube and catalogued. In some applications, the core tube is pulled out of the drill string entirely before the head assembly and/or the overshot are removed, but the method remains otherwise equivalent.

As mentioned above, drill rods 32 are gradually attached to each other in end-to-end fashion to form the drill string as the borehole's length increases. During this operation, a worker places a new drill rod on a drill rod holder 37 of the drilling machine 30. The drilling machine 30 will then lock the drill rod to the rest of the drill string. Inversely, when a particular exploration is complete, the drill string 31 is removed from the borehole: the drill rods are gradually detached from each other one by one as they are retrieved from the borehole.

Both the addition and the removal of drill rods 32 to and from the drill string could be made while the drill string 31 rotates; however, to avoid injuries to the workers that could get caught in the high powered rotating and longitudinally movable drill head of the drilling machine, it is mandatory to stop the drilling machine's rotation and translation of the drill string while the drill rods 32 are added to or removed from the drill string 31. While drill rod length varies with each application, they are typically about 1.5-3 meters long (i.e., about 5-10 feet long), which means that an important number of drill rods must be added or retrieved when forming or retrieving a drill string that can be several kilometers in length. Interrupting the drilling machine during this operation thousands of times consequently leads to a significant loss of time.

Figure 2:
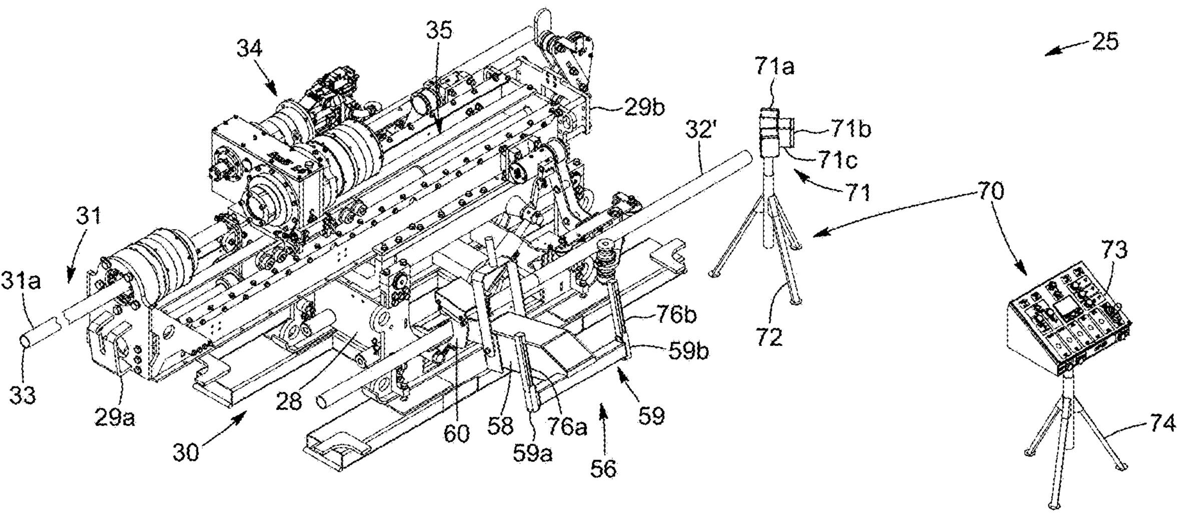
Figure 3:
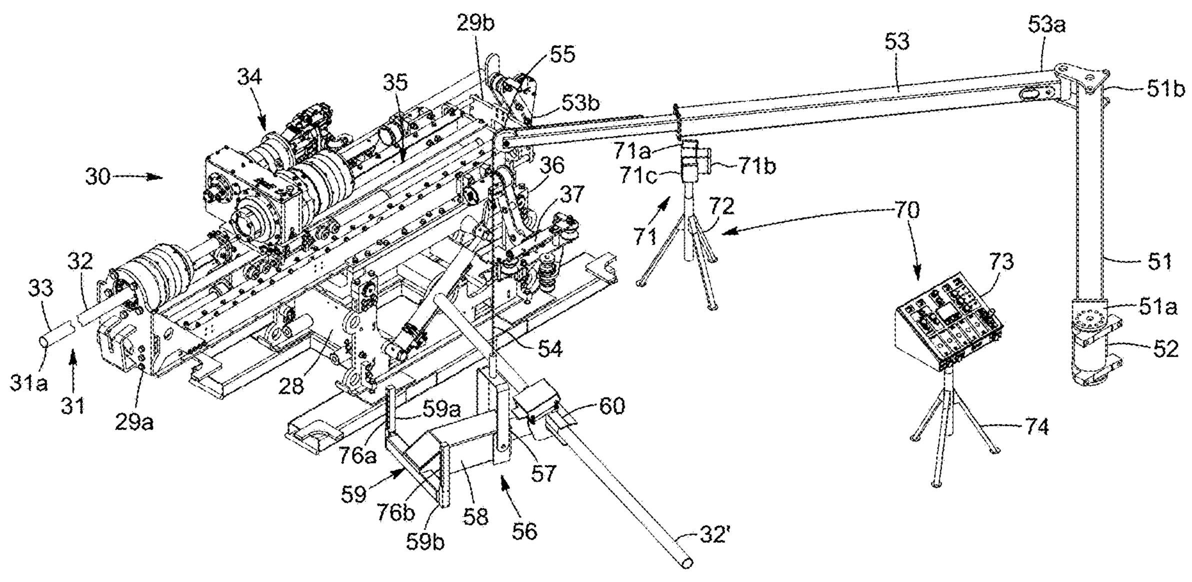
Figure 4:
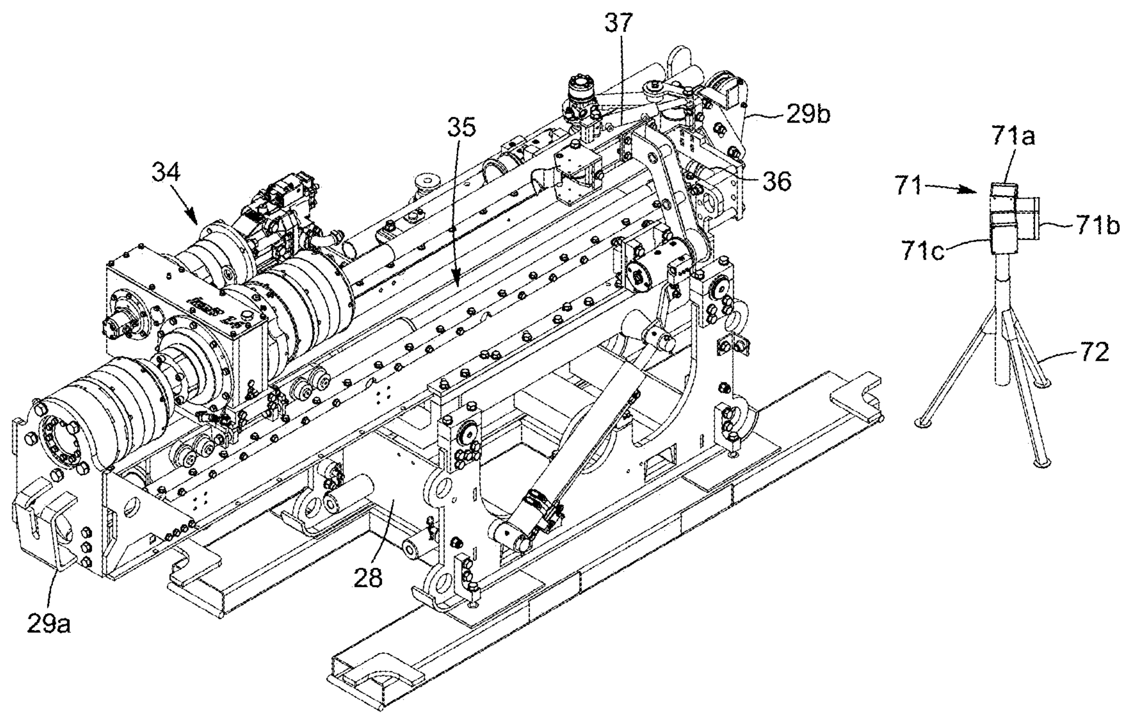
FIG. 4 is an enlarged view of the entity detection system in the vicinity of the drilling machine, the entity detection system comprising a plurality of optical scanners.

With reference to FIGS. 1 to 3, a secure drilling system 25 is provided according to a possible embodiment. The secure drilling system 25 comprises a conventional long reach drilling machine 30 for in-depth exploration drilling and core sample collecting. It is understood, however, that the illustrated embodiment could be used with any other suitable drilling machine for exploration mining.

As detailed above, the drilling machine 30 is used to create the drill string 31 that comprises a variable number of end-to-end hollow drill rods 32. The drill bit 33 is installed at a first end 31*a* of the drill string 31 for cutting a borehole through the ground and for retrieving core samples out of the ground, as known in the art.

The drilling machine 30 comprises a ground-resting drill base 28 for installation outside the borehole (not shown) and for resting on the ground. A mast 29 is attached to drill base 28. Mast 29 defines first and second ends 29*a*, 29*b*, with the first end 29*a* located nearer the borehole and the second 29*a* being located further from the borehole. The drill head 34 is carried by and movable along the mast 29 between the first and second ends 29*a*, 29*b* by means of a powered hydraulic cylinder (concealed in FIG. 1) equipped on the mast 29, as known in the art. The mast 29 is pivotally mounted to the base 28 to allow down-holes or up-holes to be drilled by the drilling machine 30.

The drill string 31 extends through the drill head 34 such that a second end 31*b* of the drill string 31, opposite the first end 31*a*, extends within and, in some circumstances, protrudes beyond drill head 34.

The drill string 31 is operatively connected to the drill head 34 near its second end 31*b* in a known manner such that the drill head 34 can rotate the drill string 31.

With the drill head 34 being longitudinally movable along the mast 29, the drill rods 32 can be gradually added or removed one by one to the drill string 31 at its second end 31*b*. While the borehole is being drilled, the drill string 31 gradually increases in length as the borehole becomes deeper and deeper, such that the drill string 31 can reach several thousand meters of length.

The drill rods 32 are added to or removed from the drill string 31 in a drill rod connexion area 35 of the drilling machine 30. The drill rod connexion area 35 is located between the drill head 34 and the mast second end 29*b*, and is usable to install or retrieve the drill rods 32 when the drill head 34 is positioned near the first end 29*a* of the mast 29.

In the embodiment shown, a mechanical drill rod arm 36 is pivotally attached to the mast 29.

The drill rod arm 36 comprises a drill rod holder 37 where a drill rod 32' that is not part of the drill string 31 may lie before the drill rod 32' is added to the drill string 31, or after the drill rod is retrieved from the drill string 31. In the drawings, the drill rod 32' reference number is primed to refer to the fact that it is not part of the drill string 31. The drill rod arm 36 is pivotable between a first position shown in FIGS. 1 to 3 located away from the drill rod connexion area 35 and where a drill rod 32' may be provided on the drill rod holder 37, or retrieved from the drill rod holder 37; and a second position (illustrated in FIG. 4) where the drill rod arm 36 is pivoted towards and into the rod connexion area 35 such that a drill rod 32' that has been unlocked from the drill string 31 may be picked up by the drill rod holder 37, or such that a drill rod 32' that is to be added to the drill string 31 may be locked onto the drill string 31.

According to the present embodiment, there is provided a manually operable drill rod carrying device 50 for handling drill rods 32' that are to be added to or removed from the drill string 31, but that are not part of the drill string 31, herein referred to as free drill rods 32'. More specifically, the drill rod carrying device 50 allows retrieving a free drill rod 32' from the drill rod holder 37 or installing a free drill rod 32' on the drill rod holder 37.

In the embodiment shown, the drill rod carrying device 50 can be of any known type, as long as it allows handling the free drill rods 32' as mentioned above. In the annexed drawings, the drill rod carrying device 50 is more particularly of the so-called zero-gravity type. The drill rod carrying device 50 comprises a post 51 rotatably mounted at its lower 51*a* end to a base 52 that is fixed to the ground. The post 51 carries at its upper end 51*b* a telescopic boom 53 that is attached at its first end 53*a* to the upper end 51*b* of the post 51 and that has an outer free second end 53*b*. A wire 54 downwardly depends from the boom 53 at its second end 53*b*. The wire 54 engages a pulley 55 at the boom second end 53*b* and may wind and unwind relative to the boom second end 53*b*. A first end (not shown) of the wire 54 engages a spool (also not shown) and its second end is attached to a drill rod handler 56 that is carried over ground by the wire 54. The spool of the wire 54 is variably biased in its rotation (as known in the art) in a calibrated way so as to counter the weight of the drill rod handler 56, whether it is loaded with a drill rod 32' or not. Consequently, a user may lift or lower the drill rod handler 56 with little effort, including when it is loaded with a drill rod 32', and may also displace it about the post 51 also with little effort since the boom 53 may pivot by means of the post 51, and may also allow the handler 56 to move (within limits) towards and away from the post 51 due to the telescopic nature of the boom 53.

The drill rod handler 56 comprises a bracket 57 for attachment to the wire 54, and a frame 58 attached to the bracket 57. A handlebar 59 comprising two handles 59*a*, 59*b* is attached to the frame 58. A grasping tool 60 is attached to the frame 58 and allows to grasp and release free drill rods 32'. Controls are provided on the handles 59*a*, 59*b* of the handlebar 59 to allow a worker W to simultaneously hold both handles 59*a*, 59*b* while controlling the tool 60.

A worker W can consequently use the drill rod carrying device 50 to install a free drill rod 32' on the drill rod holder 37 or retrieve a free drill rod 32' from the drill rod holder 37. The zero gravity drill rod carrying device 50 thus allows the worker to do this will little effort since the weight of the drill rod handler 56 and of the drill rod 32' is compensated by the zero-gravity device 50. FIGS. 1 to 3 sequentially show a drill rod 32' being retrieved from drill rod holder 37.

Still referring to FIGS. 1 to 4, is the secure drilling system 25 further comprises an entity detection system 70 capable of detecting entities within, or entities entering, a detection area surrounding at least partially the drilling machine 30. By detection area it is meant that the area is covering around, near or in the vicinity of the drilling machine 30 where an entity can be detected by the system 70. The detection area can be predetermined and/or adjusted based on various parameters, the details of which will be further described later on.

An "entity" hereby refers to any physical body, such as objects, and/or persons (it may be understood that the term "entity" can also apply to animals); although it is understood that the entity detection system 70 particularly targets the detection of individuals, such as in this embodiment, workers (W) who operate the drilling machine 30 or might stand in the vicinity thereof.

In the context of the illustrated embodiment, the entity detection system 70 is provided to detect entities near or in the vicinity of a drilling machine. However, the system 70 can be used in combination with other pieces of machinery, in other contexts or in other fields than drilling. The elements presented below in relation to this system 70 can therefore also be used in these other contexts in a similar way.

Figure 5A:
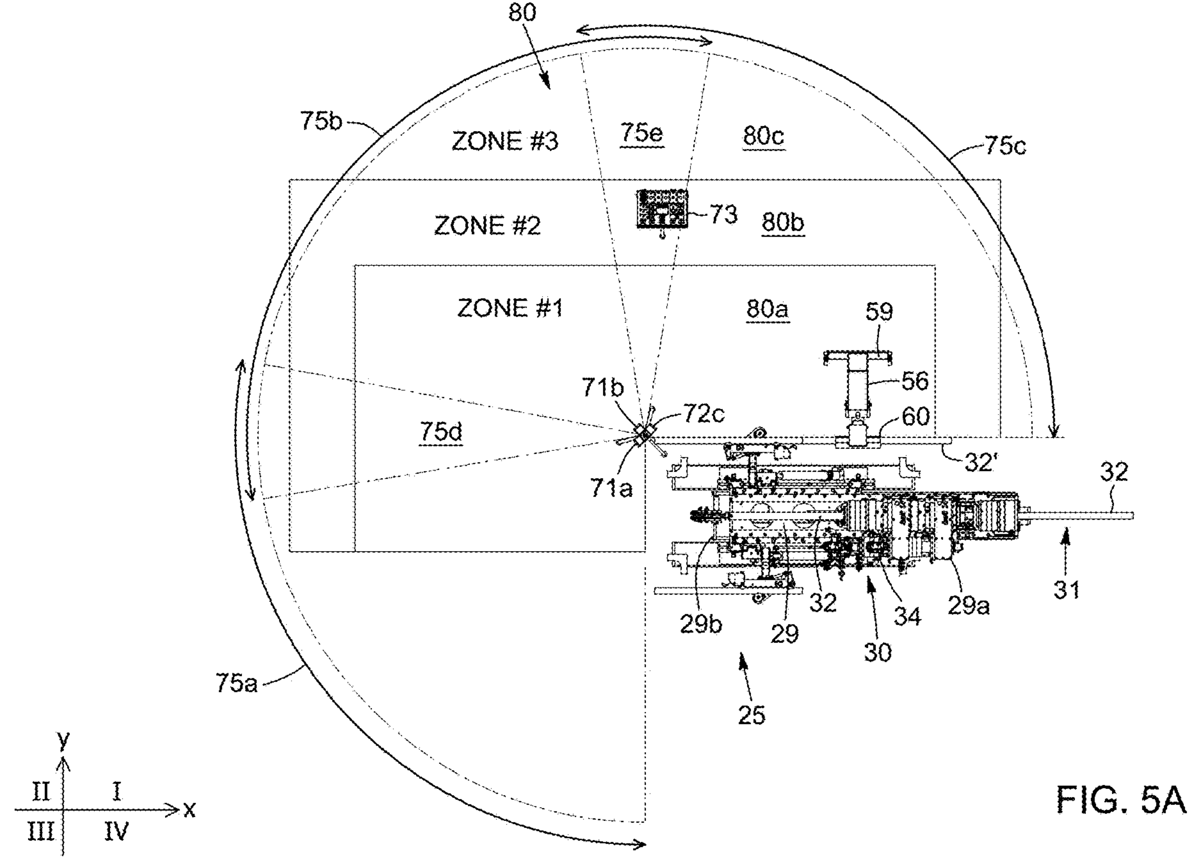
FIG. 5A is a top plan view of the entity detection system, schematically showing areas covered by the optical scanners, overlapping areas in hatched lines and zones #1, #2 and #3 of different ranks within the covered areas, according to an embodiment, the system being in a first mode.
Figure 5B:
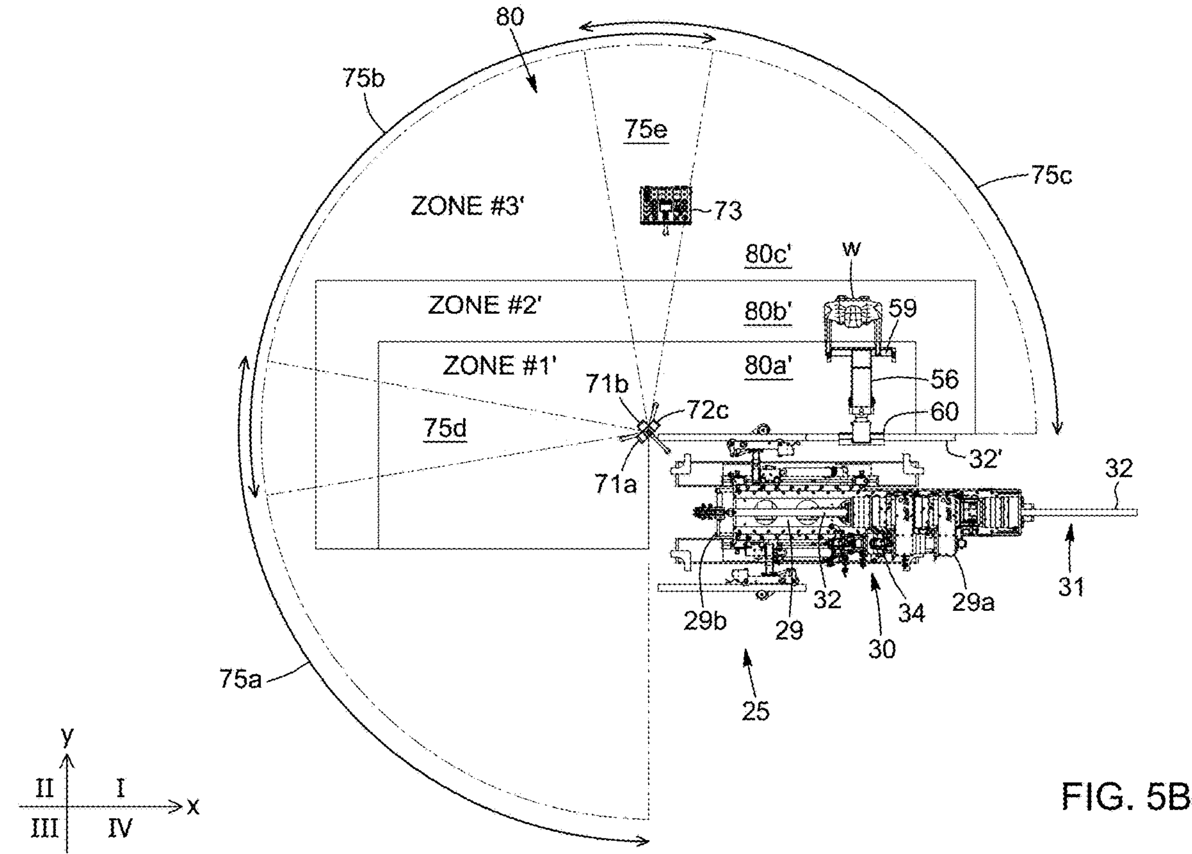
FIG. 5B is a top plan view of the entity detection system, schematically showing areas covered by the optical scanners, overlapping areas in hatched lines and zones #1, #2 and #3 of different ranks within the covered areas, according to an embodiment, the system being in a second with the zones #1, #2 and #3 differing from the corresponding zones in the first mode, based on an action realized by the entity.

The detection area can be further divided into a plurality of subzones 80 (or also defined as zones) near the drilling machine 30 (illustrated in FIGS. 5A and 5B). A subzone (illustrated 80*a*, 80*b*, 80*c*) may thus correspond to a portion of the detection area in which the entity is expected to be detected. The subzones 80 may be associated with different safety or priority levels, corresponding for instance to a distance relative to the drilling machine 30, or to components thereof considered as being potentially dangerous. For instance, safety levels may be ranked according to how close an entity is of the drilling machine 30 and thus correspond to how safe or dangerous it is to be in proximity of the machine 30. An exemplary representation of the division of subzones 80 is illustrated in FIG. 5A, where a first subzone 80*a* may be ranked as zone #1 where the level of risk corresponds to a high-risk zone (i.e., the zone closest to the drilling machine where there is a risk of collision between the entity and the drilling machine 30); a second subzone 80*b* may be ranked as zone #2 corresponding to a medium-risk zone (or moderate risk zone). In the medium-risk zone, or zone with a medium safety level, the entity may not be in danger to collide with the machine but further moving towards zone #1 80*a* can become dangerous; and a third subzone 80*c* may also be ranked as zone #3 and correspond to a low-risk zone (or mild risk zone). In the low-risk zone, the entity may not collide with the machine 30 at all.

It is understood that the shape of the detection area and/or the subzones thereof is not limited to substantially rectangular shapes, but any other shapes could be conceived.

Although the current embodiment illustrates three subzones 80 with a priority level ranking between low-risk and high-risk, it should be understood that the detection area may be divided into more subzones (or even less subzones, such as a maximum of two subzones) and the safety level of the subzones may be further divided in a more granular way. For example, the detection area may be divided into 4, 5 or 6 subzones with various safety levels. Moreover, some subzones may be associated with similar or identical safety level (i.e., zone #2 80*b* and #3 80*c* may be both ranked and/or correspond to a medium-risk zone).

On the embodiment shown, the entity detection system 70 further comprises at least one detecting device 71 (for instance at least one scanner 71) that could be of any suitable type. For example, the at least one scanner or detecting device 71 can take different forms such as ground weight bearing plates, acoustic transceivers and receivers, motion sensors and optical scanners. According to the illustrated embodiment, the entity detection system 70 comprises at least one optical scanner 71 optically covering the detection area and operable to capture the entity within the detection area. By capturing the entity within the detection area, it is meant that the at least one optical scanner 71 may be adapted to recognize and/or detect a portion of the detection area when an entity is detected (i.e., when the optical scanner 71 detects the presence of the entity within the detection area).

The at least one optical scanner 71 can be of any type known in the art. For example, in the illustrated embodiment, the at least one optical scanner 71 is a laser scanner, such as a Light Detection and Ranging (LiDAR) scanner and is adapted to capture the presence of an entity within the detection area. In the present embodiment, a 2D LiDAR is used for detection, however a 3D LiDAR may also be a viable option to achieve the same functionality.

In other embodiments, other capturing optical devices may be employed instead of the optical scanner. For example, rather than using lasers, the at least one optical scanner 71 can take the form of photographic or video cameras that can take pictures or record a video feed of the detection area. For instance, a 3D camera or a thermal camera can be used, to name only a few examples.

The area covered by the at least one optical scanner or detecting device 71 (also referred to as coverage area 75), allows to optically cover at least a minimum of 50% of a peripheral region surrounding the drilling machine 30 (i.e., a coverage area 75 surrounding extremities and beyond of the drilling machine 30). For instance, the coverage area 75 covered by the at least one optical scanner 71 is at least about 75% of the peripheral region surrounding the drilling machine 30. In other words, the coverage area 75 covered by the at least one optical scanner has a detection sector angle centered within or in the vicinity of the drilling machine of about 180 degrees (corresponding to the minimum of 50% of the peripheral region), and in this case of about 270 degrees (corresponding to the at least 75% of the peripheral region). It is understood that the center of detection area can correspond to any part of the drilling machine, for instance to a peripheral portion of the drilling machine, a particularly dangerous component thereof. In other embodiments, the coverage area covered by the at least one optical scanner 71 may allow to optically cover up to 100% of the region (i.e., a detection sector angle of about 360%). For instance, the at least one optical scanner 71 may also be operable to cover an entirety of the peripheral region surrounding the drilling machine together with the area where the drilling machine 30 is positioned.

In other embodiments, the peripheral region may also extend above the drilling machine. For instance, the at least optical scanner or detecting device 71 may be positioned and/or configured to detect entities falling on top of the drilling machine 30 (e.g., such as birds and/or rocks can be detected coming from above the drilling machine 30).

Formulated differently, the top plan view of FIGS. 5A and 5B may be represented as a Cartesian plane divided into four quadrants by a y-axis and an x-axis. The origin point (coordinates (0,0)) may correspond to the position of the at least one optical scanner 71 (i.e., also represented for instance as a center of or a point within a triangle comprising three optical scanners 71*a*, 71*b*, 71*c* mounted on a scanner support tripod 72 or to any suitable support). The drilling machine 30 can be positioned or stationed in the fourth quadrant (quadrant IV corresponding to axis y negative and x positive). Accordingly, in an embodiment, the minimal area covered by the at least one optical scanner 71 may thus be represented as first and second quadrants (quadrants I and II corresponding to the whole x-axis and axis y positive) or second and third quadrants (quadrants II and III corresponding to the whole y-axis and axis x negative). In such case, the coverage area 75 may correspond to the at least 50% of the peripheral region surrounding the drilling machine 30. In the illustrated embodiment, the coverage area 75 of the at least one optical scanner 71 represents first to third quadrants (quadrants I, II and III) and correspond to at least 75% of the peripheral region surrounding the drilling machine 30. In a similar manner, in an embodiment where the at least one optical scanner 71 covers a 100% of the area, coverage area would represent first to fourth quadrants (quadrants I, II, III, IV).

It should be noted, however, that the positioning of the drilling machine 30 in the fourth quadrant is for exemplary purposes only and is not limited to this position. Accordingly, the drilling machine 30 may be positioned in any one of the first to third quadrant and the coverage area 75 of the at least one optical scanner 71 may be adjusted according to said position. The drilling machine could also at least partially in one or more of the quadrants defining at least partially the covered area.

In the embodiment illustrated through FIGS. 1 to 4, the at least one optical scanner 71 can comprise three optical scanners 71*a*, 71*b*, 71*c*, that are mounted adjacent to one another, for instance to a scanner support tripod 72. The optical scanners could be mounted to any other support, to a portion of the drilling machine, suspended above the drilling machine and the like. Each of the three optical scanners 71*a*, 71*b*, 71*c* may be configured to cover an area coverage portion to cover together the detection area. In particular, the optical scanners 71*a*, 71*b* and 71*c* may be disposed in such a manner that the corresponding area covering portions are defined by arcs 75*a*, 75*b* and 75*c* (i.e., all together covering a portion of a circle with a center within or in the vicinity of the drilling machine 30), as shown in FIG. 5A, that collectively cover the detection area about the drilling machine 30 from the ground and up to a height sufficient to capture incoming entities (i.e., objects or persons for example). The detection area might also start from above a ground level, for instance to limit the risk of detecting rampant entities, such as mice and the like.

In an embodiment, each of the covering portions 75*a*, 75*b* and 75*c* of the optical scanners 71*a*, 71*b*, 71*c* has a covering portion sector angle comprised between about 90 degrees and about 110 degrees, centred within or in the vicinity of the drilling machine 30 (in this case, the center of the covering portion sector angle is where the support scanner tripod 72 is located). In other words, a first optical scanner 71*a* may cover at least the third quadrant (quadrant III) (corresponding to a 90-degree angle) or at least the third quadrant together with a portion of the second quadrant (corresponding to a 110-degree angle); a second optical scanner 71*b* may cover at least the second quadrant (quadrant II) or the second quadrant together with a portion of the first and/or third quadrant (quadrants I and III); and a third scanner 71*c* may cover at least the first quadrant (quadrant I) or the first quadrant together with a portion of the second quadrant (quadrant II). Accordingly, the optical scanners 71*a*, 71*b*, 71*c* can cover the whole 270-degree area (first to third quadrants of the exemplified Cartesian plane).

In an embodiment, each optical scanner 71*a*, 71*b*, 71*c* covers from the ground up to a height approximately equal to or greater than about 1 meter. In a similar way, each of the optical scanner 71*a*, 71*b*, 71*c* can cover about 50 meters, from a detection area center and in a direction away from the drilling machine (i.e., in this case, the detection area center corresponds to the position of the tripod on which each optical scanner is mounted). It should be noted, however, that the distance and height are suggested in accordance with the illustrated embodiment and may be greater or lesser than this suggestion, depending on the specifications of the type of optical scanner used and the environment in which the system is in operation.

It should also be noted that, in other embodiments, each optical scanner 71*a*, 71*b*, 71*c* can be disposed at other locations to cover at least the same covering area 75. For instance, each optical scanner 71 can be independently disposed somewhere within one of the first to third aforementioned quadrants and be oriented towards the drilling machine 30 to cover said covering area 75. Accordingly, in some embodiments, two or more of the optical scanners 71 (e.g., optical scanner 71*b* and 71*c*) may be spaced from each other from a scanner separation distance corresponding to a sufficient distance between each optical scanner 71 to cover at least the same covering area 75. The scanner separation distance may be greater or equal to 1 meter, for example.

Further shown in FIGS. 5A and 5B, the detection area comprises at least one area of overlap, or overlapping area, at least partially defined by successive- or adjacent-areas covered by scanners 71*a*, 71*b*, 71*c* identified as 75*d* and 75*e*. For example, the first optical scanner 71*a* can cover a first portion of the coverage area (covering portion 75*a*) and the second optical scanner 71*b* can cover a second portion of the coverage area (covering portion 75*b*). The second covering portion or portion 75*b*, covered by the second optical scanner 71*b*, may superimpose at least partially with the covering portion 75*a* covered by the first optical scanner, and thus define a first overlapping area 75*d*. This example may also apply to the third optical scanner 71*c* overlapping with the second optical scanner 71*b* to define a second overlapping area 75*e*.

In an embodiment, the first and second overlapping areas 75*d*, 75*e* both have a first and second overlapping sector angles centred within or in the vicinity of the drilling machine 30 (again, in this case, the center being the position of scanner support tripod 72). The first and second overlapping sector angles may be between about 20 degrees and about 30 degrees. In other words, an optical scanner (for example the first optical scanner 71*a*), having a covering portion sector angle between about 100 degrees and about 110 degrees, may cover 90 degrees of one of the four quadrants (quadrant III) and another 20 to 30 degrees of overlap in another one of the four quadrants (quadrant II).

In the illustrate embodiment, these areas of overlap 75*d*, 75*e* serve as continuous integrity verification for the entity detection system 70 at any time where an entity is detected moving within overlap areas 75*d*, 75*e*, it should be detected by two different optical scanners, namely scanners 71*a* and 71*b* for the overlap area 75*d* and scanners 71*b* and 71*c* for the overlap area 75*e*. In the case where an entity moving within one of those overlap areas is detected by one scanner but not the other, a suitable response can be programmed to occur by a controlling device 73, for example, an alert, a system maintenance, and verification message sent to an operator, and/or a forced shutdown for the drilling machine 30 (more details on this matter is further described below).

In the illustrated embodiment, the optical scanners 71 may further include a transceiver capable of wireless communication with the controlling device 73 that is carried for instance by a support tripod 74 and that also comprises a transceiver. The transceiver may be any suitable wireless adapter, such as Wi-Fi or Bluetooth adapters. In other embodiments, the optical scanners 71 may be in wired communication with the controlling device 73, i.e., the detection system might further comprise cables connecting the optical scanners 71 to the control device 73.

With further reference to FIGS. 1 to 4, the controlling device 73 may further be part of the entity detection system 70. The controlling device 73 may be a computer 73, a cluster of computers, a server or other suitable device that can be of any type and composition to carry out the operations described herein. The controlling device 73 may further either be on premise (for instance at the same location as the optical scanners 71) or at a remote location, such as part of a Cloud architecture, for example. The controlling device 73 can comprise usual components such as for example a processor or plurality of processors (e.g., a CPU), a data storage device such as a hard drive, a volatile memory unit such as RAM, a wireless transceiver, I/O ports, a user interface including for example a GUI, a keyboard and a mouse, and suitable software that may be executed by the processor to accomplish required operations as detailed hereinafter. As previously explained, the controlling device 73 may in operative communication/connection with the optical scanners 71. In embodiments, the optical scanners and the controlling device 73 operate as part of a Control Area Network (CAN) and transmits CAN messages and/or data with one another.

In the embodiment shown, the controlling device 73 is configured to detect a position of the entity captured by at least one of the optical scanners 71 within detection area, i.e., within one or more of the subzones 80 thereof. For instance, if the first optical scanner 71*a* captures the presence of an entity 5 meters away from the drilling machine 30, the controlling device can receive data (in the form of location or coordinates) from said first optical scanner 71*a* and determine that the position of the entity corresponds to subzone #2 80*b*. In other words, the controlling device 73 can be configured to associate the position of the entity, received from at least one of the optical scanners 71, with one of the corresponding subzones 80.

The controlling device 73 can be configured to divide the detection area into the plurality of subzones 80. In an embodiment, the number of subzones 80 and the distance between of the subzones 80 and the center of the detection area or a distance between the subzones and the drilling machine 30 can be set by the controlling device 73. For example, based on the area that each optical scanner 71 can cover, i.e., the maximum or predetermined height and distance of each optical scanner 71, the controlling device 73 may be configured to divide the detection area into the different priority levels corresponding to the different subzones. For instance, in the illustrated embodiment, the controlling device is configured to divide the detection area into three subzones 80*a*, 80*b* and 80*c* with priority levels ranking from high to low. The division of the detection area may also be referred to as the detection mode (or also called the first configuration mode or default mode), in which the controlling device sets up the system 30 in order to detect any entity within the detection area, regardless of their position. For instance, FIG. 5A illustrates a configuration in which the distribution of the subzones is made according to the detection mode (or first configuration mode). In the illustrated embodiment, the subzones associated with a higher level of risk, such as subzones #1 and #2 80*a*, 80*b* for instance, cover a significant portion of the detection area. The detection mode can initially be configured to significantly decrease the risk of an entity coming into contact with or proximate to the drilling machine 30 (i.e., entering subzone #1 for example).

It can be appreciated that the division of the detection area into subzones is highly customizable and can be configured based on the environment and needs of the user, i.e., the detection mode may be configured differently for different needs. For example, in some other embodiments the security concerns in the working environment may be greater and require a higher level of granularity. In this case, the controlling device 73 may be configured to divide the detection area into six zones (not shown), with zones #4 to #6 being labelled as low-risk zones, zones #3 as medium-risk zone, and zones #1 and #2 as high-risk zones, as examples only. In another example, the detection area may be simply divided into two subzones with two different safety or priority levels. With these examples, it can also be appreciated that the safety or priority level of each subzone can also be customizable and can be modified based on various needs.

In other embodiments also, the distance of each subzone to the drilling machine or to any part thereof or to any position in the vicinity thereof can be customizable. For example, and without being limitative, each subzone can be configured to have a maximum distance of about 4 meters and a minimum distance of about 1 meter. In a similar manner, the controlling device 73 can configure a subzone 80 to fill out the remaining detection area (i.e., fill the maximum distance and height of the optical scanners 71 or even fill the limits inside a natural environment). For example, in the case where the system 70 operates in a closed environment (in a cave for example) and the detection area is divided into three subzones (as shown in FIGS. 5A and 5B), subzone #3 80*c* may cover from the end of subzone #2 80*b* to the remaining of the environment and up to the environment boundaries (the walls of the cave).

The controlling device 73 can further be configured to trigger at least one action signal based on the safety/priority level of the subzone corresponding to the determined position of the detected entity. In other words, upon determining in which subzone the entity is located and what is the priority level associated with this subzone, the controlling device 73 can trigger a response in the form of one or more action signals. The at least one action signal can comprise a command of the drilling machine 30. For instance, a command may correspond to an action that the machine 30 can perform or a change in the machine's 30 behavior.

In an embodiment, the controlling device 73 may be in communication with the drilling machine 30 and may be configured to send the at least one action signal (messages and/or data) to the drilling machine 30. The drilling machine may thus also comprise hardware and software components to communicate via the CAN and receive instructions from the controlling device 73.

The controlling device 73 may further trigger a stop command, to stop the drilling machine 30 from operating. Ways to stop the drilling machine 30 from operating may consist in sending a command to temporarily stop all or part of the processes of the machine or even shut off the power of the drilling machine 30 entirely. In an embodiment, the stop command may be triggered when the entity is detected within the first subzone 80*a* (subzone #1), meaning that the entity is too close to the machine and a danger can occur. However, the stop command is not limited to subzone #1 80*a* and could be triggered when the entity is detected in other subzones, for example subzone #2 and/or subzone #3 80*b*, 80*c*. Also, in another embodiment, the stop command may also be withdrawn (or another command is sent by the controlling device 73) to resume the operation of the drilling machine, when the entity is outside of the subzone, i.e., outside of the first subzone 80*a*. For example, in an embodiment, resuming actuation of the drilling machine 30 may comprise a start command triggered by the controlling device 73. The controlling device may then send the start command to the drilling machine 30, when the entity is detected outside of the mentioned subzone (subzone #1 for instance 80*a*).

When the entity is detected within at least one of the subzones, the controlling device 73 may also be configured to send a deceleration command to the drilling machine 30. The deceleration command may be triggered when the entity is in a medium and/or low-risk subzone, such as subzone #2 80*b* for example. In the illustrated embodiment, the drilling machine 30 may be configurable to operate at a different drilling speed (i.e., the rotation speed of the drill head 34 and/or the drill rods 32). For instance, the drilling machine 30 can be configurable into a normal configuration and a decelerated configuration. In an embodiment, in the decelerated configuration, the drilling speed of the machine 30 can be reduced, so as to be comprised between 1% and about 50%, for instance between 2% and about 30%, for instance between 5% and 20% of the drilling speed in the normal configuration (i.e., in the normal configuration, the drilling speed corresponds to 100%). As an example, in the normal configuration, the drilling speed of the machine can be comprised within 600 and 1200 rpm. In the decelerated configuration, however, the drilling speed of the machine 30 may be lowered for instance below 250 rpm, for instance below 100 rpm, for instance to about 50 rpm. The controlling device 73 can thus send the deceleration command for the drilling machine 30 to operate at a certain rotation speed depending on a particular subzone in which the entity is detected. In other configurations, the deceleration command may simply be an indicator that the drilling machine 30 must switch from the normal configuration to the decelerated configuration, i.e., the drilling machine 30 is configured to determine at what drilling speed it should be lowered.

It should be noted that, in other embodiments, the drilling speed may vary depending on the type of drilling machine 30 and is not limited to the illustrated embodiment. Notably, in the decelerated configuration, the drilling speed may be set to a higher or lower rpm depending on the context of use and the need.

In an embodiment, the controlling device may further be configured to refrain from sending a stop command. Refraining from sending a stop command means that the controlling device 73 is further configured to bypass the stop command or any other action signal when a particular action is realized by the entity, or the entity is located at a particular position.

Notably, in the illustrated embodiment, refraining from sending a stop command can occur when the entity is detected within a safe zone of the detection area or when the entity is realizing an authorized or safe action in the vicinity of the drilling machine 30.

To do so, the system 70 may further comprise an authorized presence detection assembly. The authorized presence detection assembly can be configured to detect the entity within the particular safe zone of the detection area and/or detect that the entity is realizing the predetermined safe action.

In an embodiment, the authorized presence detection assembly may comprise a plurality of sensors that can send a signal to the controlling device 73 when the entity is detected. For instance, an example of a safe zone sensor may correspond to a pressure plate (comprised with sensors) located near the drilling machine. When the entity, in this case for example a worker (W), steps on the plate, a signal can be sent to the controlling device 73 to indicate that the entity is within the safe zone. In another example, a device or sensor can be carried by the worker (on their equipment for instance) and send a signal to the controlling device 73 when the worker is at a certain distance of the drilling machine 30.

With reference to FIG. 5B of the present embodiment, when the safe (or authorized) action is detected by the authorized presence detection assembly, the controlling device may further be configured to change the set up of the system 70 into an intervention mode or second mode. As it can be illustrated as a comparative measure with FIG. 5A, the intervention mode differs (or has different measures) from the detection mode, by the way the subzones 80 are divided. Notably, the subzones 80*a*', 80*b*', 80*c*' in the intervention mode are divided in a different way than the ones 80*a*, 80*b*, 80*c* in the detection mode. For instance, in FIG. 5B, dimensions of the subzones, such as subzones #1' 80*a*' and #2' 80*b*', are smaller than dimensions of the corresponding subzones 80*a*, 80*b* illustrated in FIG. 5A. In other words, the intervention mode makes it possible to scale down the zones with respect to the position of the drilling machine. For example, a surface area of each subzone in the intervention mode can be scaled down by about 20%, for instance by about 40%, for instance by about a half (or 50%) compared to the subzones in the detection mode 80 (it should be understood that the term surface area is illustrative of the 2D representation of FIGS. 5A and 5B and that the volume can be implied in the case of a 3D representation).

As it can be appreciated, when the entity is realizing the safe or authorized action the fact that at least one of the subzones 80*a*, 80*b*, 80*c* is scaled down to a smaller subzone 80*a*', 80*b*', 80*c*' advantageously allows the entity to be positioned in an intervention sub-area (not illustrated) comprised within the detection area. For instance, due to the change from the detection mode to the intervention mode, the entity is positioned within subzone #2' 80*b*' when the system is in the intervention mode instead of being positioned within the subzone #1 80*a*, when the system is in the detection or default mode. The intervention sub-area may be represented as a conceptualized position of the entity within the detection area, while the entity is realizing the safe action. For example, in illustrative FIG. 5B, the intervention sub-area corresponds to the position of the worker (W) at the moment they are realizing the safe action. In other words, the controlling device 73 sets up the intervention mode when the worker (W) is positioned in this conceptual intervention sub-area and realises the safe action. Accordingly, at least one of the subzones 80 is scaled down, such as illustrated in FIG. 5B, so that subzone #2 80*b*' replaces, in part, the position (because of the scale down) of previously subzone #1 80*a* at the intervention sub-area (i.e., because of the change in division, subzone #1' 80*a*' is lower and subzone #2' 80*b*' takes the place of former subzone #1 80*a*. Consequently, the entity, in this case the worker, is then detected as being in subzone #2' by the system 70.

As it can further be appreciated, this configuration allows the detection system 70 to remain active while keeping the initial number of subzones 80 and maintaining the level of security across the entire detection area.

It should also be understood that, according to the present embodiment, when the entity stops or is not realizing the safe action, the controlling device 73 turns back or sets up the system 70 back in the detection mode.

As illustrated in FIGS. 5A and 5B of the present embodiment, the authorized presence detection assembly might come in the form of the previously mentioned drill rod handler 56, where the manipulation of the drill rod handler 56 by the entity corresponds to the safe action. In this regard, it can be understood that the entity is at least in part in this conceptualized intervention sub-area when the drill rod handler 56 is being manipulated (e.g., the worker is in the intervention sub-area when they are manipulating the drill rod hander 56). In this embodiment, contact sensors 76*a*, 76*b* are respectively provided on the handles 59*a*, 59*b* such that controlling device 73 can detect whether at least one of the worker's hands is gripping one of the handles 59*a*, 59*b* of the handlebar 59. Accordingly, the drill rod handler 56 may also comprise wire transceivers, together with hardware and software components suitable for communicating with the controlling device 73. The drill rod handler 56 can thus communicate with the controlling device 73 via CAN communications, which can be either wired or wireless. The contact sensors can therefore notify the controlling device that a safe action is being realized (i.e., the worker is grabbing at least one of the handles).

As can be appreciated, without the entity detection system 70, the drilling machine 30 would have to be stopped every time an entity (a worker) is near the drilling machine 30 or every time a manipulation must be done with the drilling machine (for example when the worker is placing a new drill rod 32). The interoperability between the components of the entity detection system 70 therefore advantageously allows the drilling machine 30 to be kept constantly running, as long as the entity is not in a high-risk subzone 80*a* or 80*a*' (i.e., in movement in a low/medium risk subzone, realizing the execution of a safe action or positioned on a safe zone).

In some embodiments, the controlling device may be configured to trigger a stop command or any other action command, even if an entity is detected within a safe area or realizing a safe action. For instance, in some scenarios, more than one entity can be detected within the detection area. A first entity can be realizing a safe action or can be detected in the safe area, while at the same time a second entity can be detected in one of the subzones 71. For example, this can occur when a worker is manipulating the rod handler 56, while another worker is moving or is standing in the first subzone 80*a* (subzone #1). In this case, the controlling device may trigger the stop command, even if the safe action is being realized. In other words, the controlling device may take the decision not to override the stop command if another entity (the second entity) is detected within one of the subzones 71. While this configuration occurs when the second worker is detected within the first subzone 80*a*, in scenarios where security must be increased, the controlling device parameters can be adjusted to trigger the stop command in other subzones (subzones #2 and #3 for example) or even any subzones 71 if necessary.

The detection system 70 may further comprise a signalling device (not shown), also called notification device, configured to notify the presence of the detected entity (for example a worker) in the detection area. The signalling device may be part of or separated from the controlling unit 73 and can operatively communicate therewith. For example, the signalling device may be mounted or integrated directly within the controlling device 73. Alternatively, in other embodiments, the signalling device may be mounted on the drilling machine 30 instead. The signalling device may further be attached to the worker's equipment or carried by the worker, i.e., connected on a helmet or a piece of clothing of the worker.

In some embodiments, the signalling device may send notification signals when the entity is detected within the detection area. For instance, the signalling device can provide an audio or visual signal to the entity (W) when they are detected within the detection area.

In embodiments, the notification signals provided by the signalling device may vary in intensity and/or duration depending on within which subzone the entity is detected, going from low intensity to high intensity depending for instance on the proximity of the entity with respect to the drilling machine 30. In some exemplary embodiments, the signal can comprise a light, or a plurality of lights, that change colour and/or intensity depending on the entity position. In a similar manner, in other embodiments, the signal can comprise an audio cue with varying tonality or patterns (for example, the sound of an alarm bell). It should be understood, however, that the combination of both audio and visual signals can also be provided as indicators of the presence of an entity within a subzone.

Figure 6:
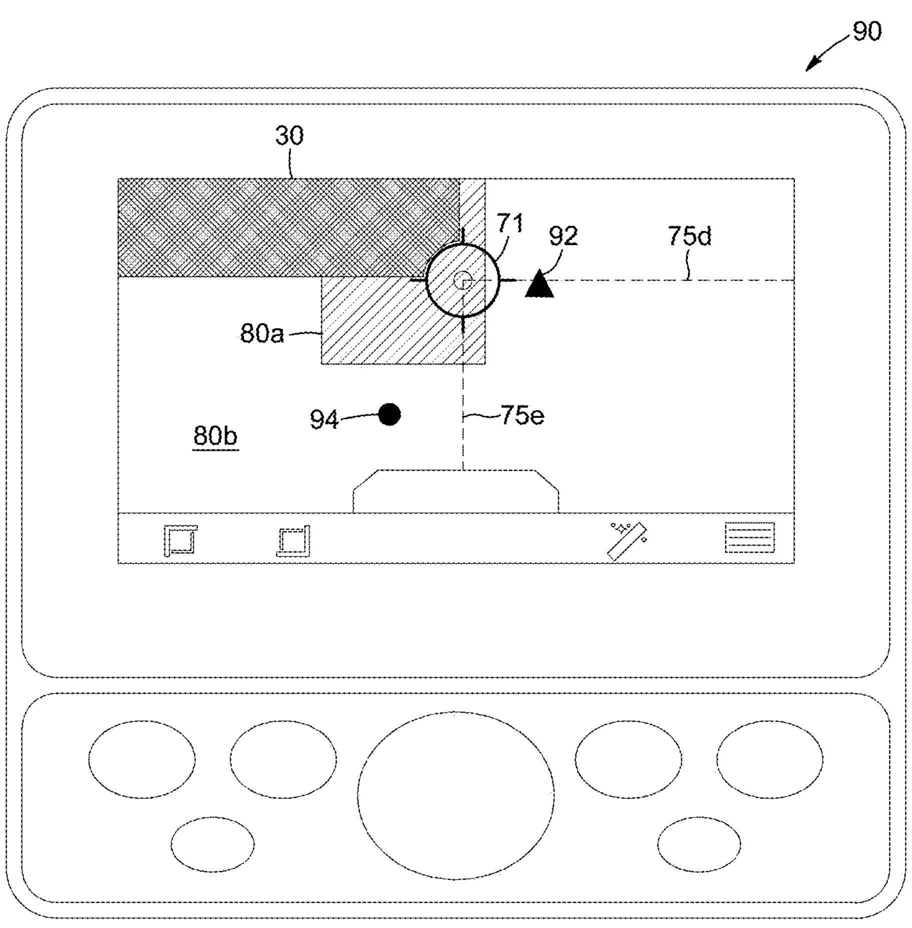
FIGS. 6-8 are schematic views of a display of the entity detection system, showing an entity being detected by the system in a detection area covered by the optical scanners.
Figure 7:
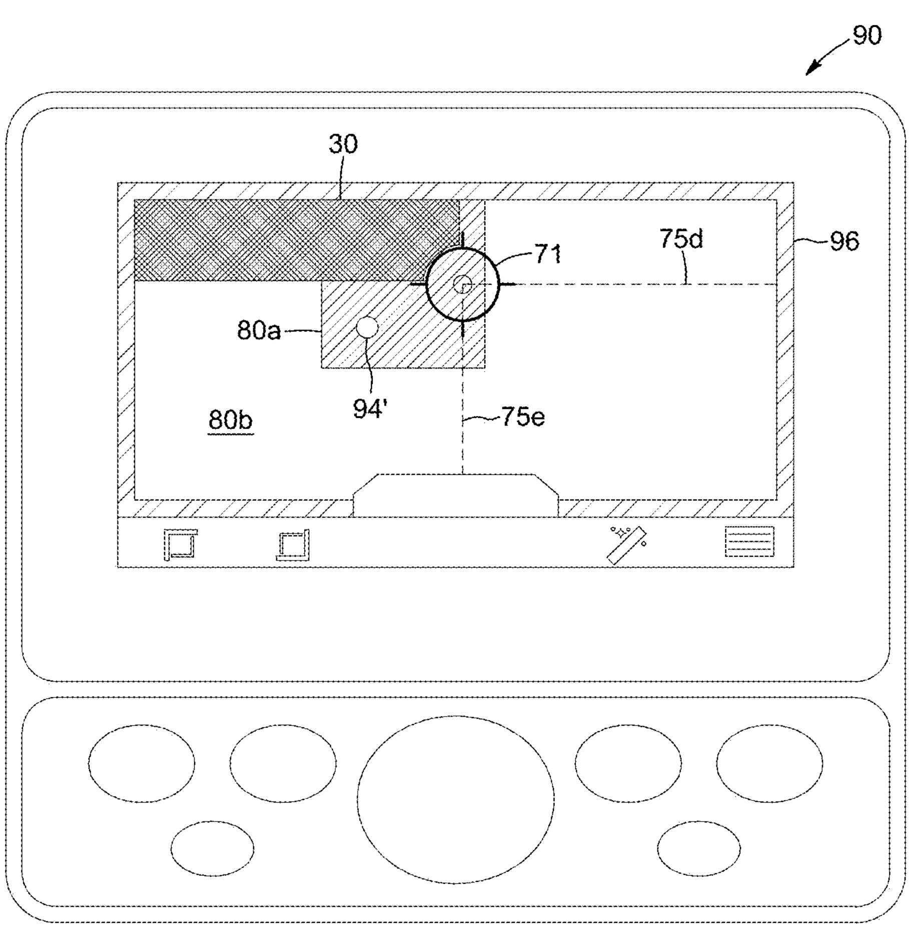
Figure 8:
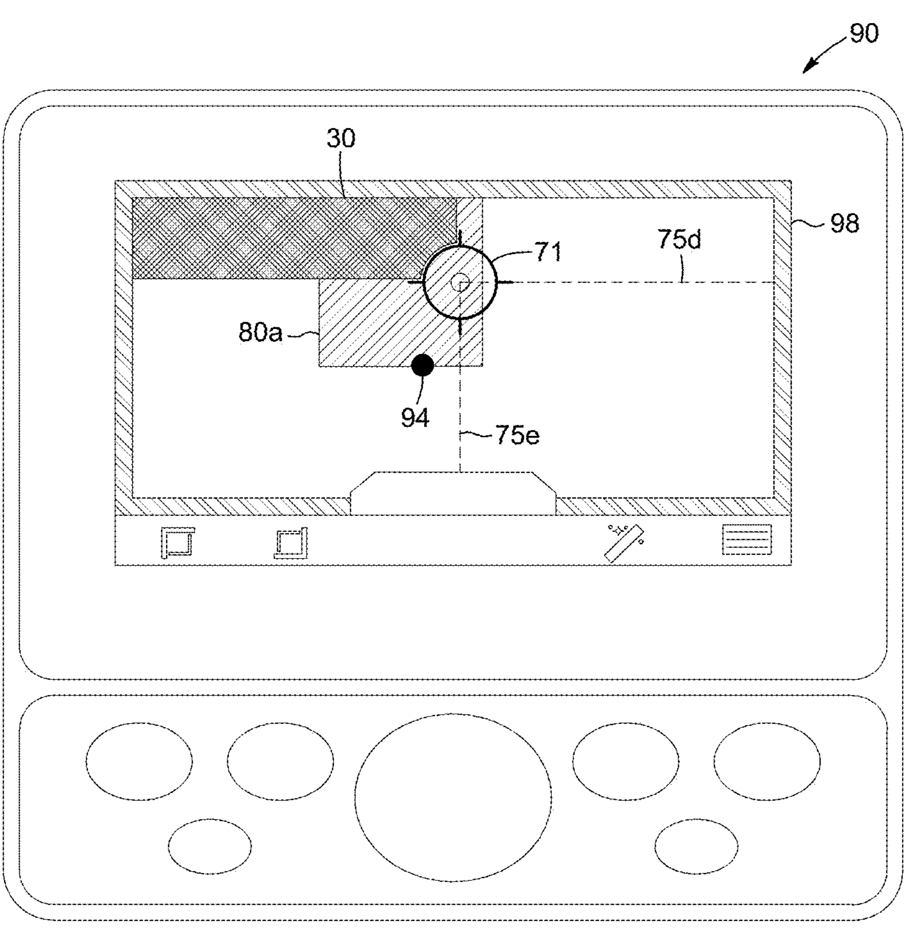

Now referring to FIGS. 6 to 8, the signalling device may further comprise a display 90 (or display unit) to visually represent the position of the entity within the detection area, i.e., provides in real time the position and/or movements of the entity within the detection area. In the illustrated embodiment, the display 90 is mounted to or formed integral with the controlling device 73, however other configurations are possible where the display is part of one or more other devices (for example a mobile device). Briefly described, the display 90 shows a schematic representation of the detection system 70 components. In the representation illustrated in FIGS. 6 to 8, the drilling machine 30 is represented as a black box (dotted box); subzone #1 80*a* or high-risk zone is represented by the lined box; subzone #2 80*b* or medium-risk zone is represented by the empty box, or simply the rest of the screen; the circle within subzone #1 corresponds to the position of the optical scanners 71; and the dotted line represents the overlap areas 75*d*, 75*e*. Although only subzones #1 and #2 80*a*, 80*b* are illustrated, other configurations are possible where the display 90 further provides visual representations of other subzones, for example a third subzone.

Entities detected within the detection area are displayed with icons, for instance circles and triangles. Although, in the present embodiment circles and triangles are illustrated to represent an entity, other shapes or illustrations can be used to achieve the same representation.

In FIG. 6, an entity is represented by a detected icon 94 (represented by the black dot). The detected icon 94 may represent an entity, detected by the detection system, which is located within a medium-risk and/or low-risk subzone. For example, in this case, the entity is located within subzone #2 80*b* of the detection area. Moreover, when an entity is detected within the one of the overlap areas 75*d*, 75*e*, represented by the dotted lines, the icon changes to an overlapping icon 92 (represented by the triangle).

In FIG. 7, when the entity is detected within a high-risk zone, such as subzone #1 80*a*, the detected icon changes for a warning-detected icon 94' (represented with a white dot). In other embodiments, the colour of the icon may change, for example from green to orange, and the shape of the warning-detected icon may vary. A warning overlay 96 may also be provided on the display to further accentuate the fact that an entity is detected within a high-risk zone. For example, the warning overlay 96 may be presented as a distinct pattern or a distinct colour such as orange or red.

FIG. 8 illustrates an embodiment of the display 90 in which a risk-notification overlay 98 may further be provided. The risk-notification overlay 98 may be displayed, for example, when the entity is crossing between a low/medium-risk subzone to a high-risk subzone. For instance, in the illustrated embodiment, the detected icon 94 (i.e., the entity) is positioned between subzone #1 80*a* and subzone #2 80*b*. Thus, the risk-notification overlay 98 signals that the entity is about to enter a dangerous or unsafe area. The notification overlay 98 may be presented with a similar or different pattern than the warning overlay 96 and with a different colour, such a yellow, for example.

Figure 9:
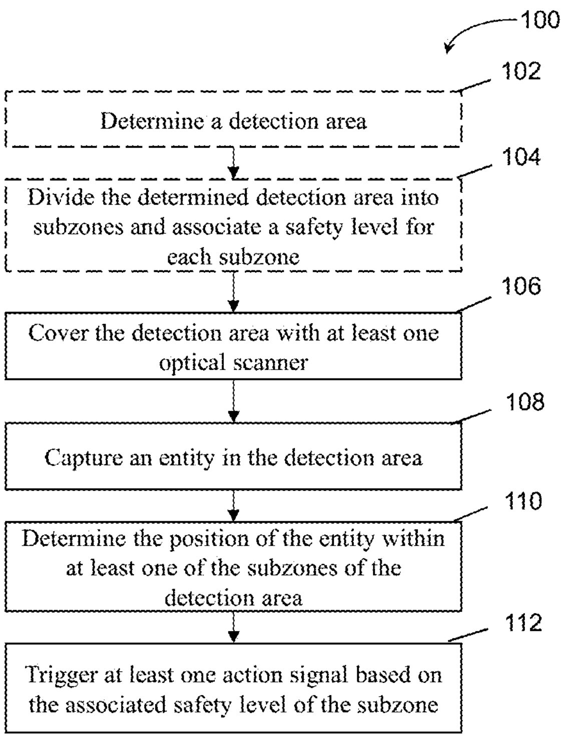
FIG. 9 is a flowchart illustrating the different steps of a method for detecting an entity within a detection area surrounding at least partially the drilling machine, according to an embodiment.

With additional reference to FIGS. 5 and 9, an exemplary method 100 for detecting an entity in a detection area surrounding at least partially a drilling machine 30, i.e., also referred to as the entity detection method 100, is shown according to a possible embodiment. By detecting an entity, it is meant that the entity is in movement within the detection area or is getting inside the detection area. Further, the detection area can be divided into a plurality of subzones 80, each one of the pluralities of subzone 80*a*, 80*b*, 80*c* can be associated with a corresponding safety level. Accordingly, in the present embodiment, it can be understood that the entity detection method can be carried out by the components of the previously mentioned entity detection system 70. It can be appreciated, however, that other variants of the above-mentioned detection system 70 can also be suitable to carry out the method 100 herein described.

To realize the method 100 described herein, preliminary steps may be realized. For instance, calibration steps can be previously carried out to allow the detection of entities in the detection area. In an embodiment, calibration steps may comprise steps 102 and 104.

In step 102, an area surrounding at least partially the drilling machine 30—or any other space to be secured—can be scanned to determine the dimensions and/or boundaries of the detection area. For example, at least one optical scanner 71 can be provided near (adjacent to) the drilling machine 30 and scan the surrounding environment. An operator can thus evaluate the appropriate dimensions of the detection area based on the position of the drilling machine within a given environment. In other embodiments, the operator can use other measuring apparatus or methods to determine the dimensions of the detection area. Step 102 may further comprise the adjustment of the at least one optical scanner 71 to set the detection at a certain distance and height, to define the detection area. The adjustment of the at least one optical scanner can be autonomous, for example the at least one optical scanner automatically determines the boundaries of the detection area. The adjustment can also be manual, where the operator manually enters predetermined boundaries of the detection area.

Subsequent step 104 may comprise dividing the detection area into subzones 80 and further associate a safety or priority level to each one of the divided subzones 80. For instance, the detection area can be separated into different segments (i.e., the subzones) having a certain distance relative to the drilling machine 30.

As an example, a detection area may have a boundary at 20 meters with respect to the drilling machine 30. The 20-meter area may be divided into three sequential subzones 80*a*, 80*b* 80*c*, with the first subzone being approximately 5 meters (from 0 to 5 meters with respect to the drilling machine 30 or a center of the detection area), the second subzone being approximately 10 meters (from the end of the first subzone at meter 5 up to 15), and the third subzone being the remaining 5 meters (from the end of the second subzone at meter 15 up to the boundary of the detection area at meter 20). In embodiments, the subzones 80 are not necessarily sequential and can set at various locations within the detection area.

Once the subzone is divided, they can be labelled or associated with a safety level. The level of risk associated with a subzone may be attributed based on the distance of the subzone with respect to the drilling machine 30. In an embodiment, the closest subzone may be associated with a high-risk zone, and the farthest subzone may be associated with a low-risk zone.

In the present embodiment, the step 104 comprises parameterizing a controlling device 73 with subzones data and associating the subzone with the corresponding safety level. For instance, upon determining the boundaries of the detection area, an operator can parameterize into the controlling device 73 the distance of each subzone and what action can be triggered based on a detection within each subzone. The parametrization of the controlling device 73 may include setting up a detection mode (or first configuration mode or default mode) in which the subzones are determined based on the detection area to further maximise the detection of an entity and safety around the drilling machine 30. The division of the subzones may include the distribution in the form of range and size of each one of the subzones according to a specific scale, for example.

In the present embodiment, the calibration steps 102 and 104 should be carried out without any person or object moving in the subzones (80*a*, 80*b*, 80*c*) in order to properly determine the boundaries of the detection area. The detection of a person or object may result in a false measurement of the boundaries and the calibration steps must be performed again.

In step 106, once the calibration steps 102, 104 have been realized, the at least one optical scanner can be optically covering the detection area. More specifically, the at least one optical scanner can be positioned at a particular location so as to be able to detect an entity within the determined detection area. For example, the at least one optical scanner 71, such as three laser scanners 71*a*, 71*b*, 71*c*, can be mounted on the tripod 72 or a pole and placed in vicinity of the drilling machine 30. The at least one optical scanner 71 can, furthermore, be provided with a range or coverage area 75 that can be equal or superior to the boundaries of the detection area. As it can be appreciated, in some embodiments, the placement and coverage area 75 of the at least one optical scanner 71 can cover up to 75% (or 270 degrees) around the drilling machine 30. In other embodiments, at least two optical scanners may be provided at different locations within or in the periphery of the detection area to optically cover the detection area.

Once the at least one optical scanner is covering the detection area, step 108 further comprises capturing the entity within the detection area with the at least one optical scanner. For example, the entity can be captured when the at least one optical scanner 71 detects a variation in the environment, for instance, when the at least one optical scanner 71 receives a different result than a previous response signal. Notably, in an embodiment, the at least one optical scanner 71 can determine the presence of an entity if the signal corresponding to a distance is different from the one corresponding to the limit of the coverage area 75. In other embodiments, capturing may also refer to detecting the presence of the entity without necessarily knowing its distance.

Step 110 may comprise determining the position of the entity within at least one of the plurality of subzones. This step may include comparing the position of the entity, i.e., the entity coordinates in relation to the drilling machine 30, with the distance or range of the different subzones. For example, the controlling device 73 can, based on the estimated distance received from the at least one optical scanner 71, compare the coordinates of the entity (or its relative distance with respect to the drilling machine 30) with the distance range (or locations) defined for each subzone of the plurality of subzones. Accordingly, if the entity coordinates or relative distance corresponds to a distance range of a subzone, the position of the entity can be associated with the corresponding subzone. Upon determination of the position of the entity, step 110 may further comprise the determination that the entity is not realizing a safe action within the detection area. In such a case, the step may further change the distribution and/or division and/or relative positions and/or dimensions and/or number of the subzones of the detection area according to an intervention mode (or second configuration mode), such as the one further described above. The previously mentioned controlling device 73 may set up the intervention mode to divide the subzones 80 with a different distribution, such as scaling down the subzones 80, in a way that allows the entity to realise the safe action while the drilling machine 30 is in operation, thereby not unduly stop the drilling machine while still ensuring a safety of the entity.

At step 112, upon determining the position of the entity within a subzone, at least one action signal can be triggered based on the determined subzone and can comprise a command sent to the drilling machine 30. In the present embodiment, triggering a signal may come in the form of instructions sent to the drilling machine in order to modify its behaviour. For instance, instructions may come in the form of stop commands, which will stop the drilling machine 30 from operating, and/or in the form of deceleration commands which will diminish the rotation speed of the drilling machine 30. In embodiments, step 112 may include triggering warning signals or cues in the form of visual and/or auditory signals.

In the illustrated embodiment, step 112 may be realized by the controlling device 73 alone or in communications with other devices and apparatus, such as one or more signalling devices.

In an embodiment, step 112 may also refrain from triggering an action signal when a safe action or a safe zone is detected. For instance, a safe action may take the form of a worker manipulating a particular object, such as the handlebar 59 of the drill rod handler 56.

FIG. 10 provides an exemplary scenario of steps 110 and 112 of the method 100 (FIG. 9), in which actions are realized when an entity is detected in the detection area. In order to do so, FIG. 10 schematically portrays actions that can be realized by the entity detection system 70 and elements who are illustrated in FIG. 5A. In this scenario and without being limitative, the detection area is further divided into subzones #1 to #3 80*a*, 80*b*, 80*c* and comprises the three optical scanners 71*a*, 71*b*, 71*c*.

Based on previously mentioned step 104, subzones may formerly be distributed according to the first configuration mode. Further at step 108, when the at least one optical scanner (71*a*, 71*b*, 71*c*) detects and entity moving in its covered area (75*a*, 75*b*, 75*c*), step 110 comprises determining the position of the entity within the coverage area. The following cases may thus be determined at step 110 and step 112 and may trigger the appropriate response accordingly:

a) If the entity is detected within subzone #3 80*c*, representing a low-risk subzone, the presence of a moving entity is recognized, but the drilling operation will continue normally, including the addition or removal of drill rods 32 with the drill head 34. Step 112 may thus trigger a notification cue to the entity in the form of a visual or audio cue issued by the controlling device 73. In other embodiments, the speed of operation of drilling machine 30 might then be reduced (not illustrated).

b) If the entity is detected in subzone #2 80*b*: step 112 may trigger a warning signal, such as a light flashing on the controlling device 73 or elsewhere, an audio alarm, or the like. A command may also be sent in parallel to reduce the speed of operation of drilling machine 30. In other embodiments, step 112 may not include a speed reduction command to the drilling machine 30 and the latter may continue its operation normally.

c) If the entity is detected in subzone #1 80*a*: step 112 will trigger a signal to stop the operation of the drilling machine 30. In another embodiment, another warning signal may be triggered.

d) However, cases (a) to (c) above may not result in the occurrence of step 112 if at step 110 a single entity is detected as realizing a safe action. For instance, moving in the covered area 75*a*, 75*b*, 75*c* and grabbing by at least one hand tactical sensors 76*a*, 76*b* provided on the handlebar 59. In this case, step 110 will further change the distribution of the subzones according to the second configuration. In this way, the division of the subzones 80 may be altered so as to be scaled down (subzone #2 in the second mode will consequently take partially the position of subzone #1 in the first mode). This way, the entity realizing the safe action will be detected within subzone #2 instead of subzone #1). Then the machine will not stop, but the speed may decrease, and a warning signal may be triggered (if it was optionally decreased). Indeed, in such a case it is understood that the person is using the drill rod handler 56 and that it is this person that is detected by the system 25. Since the person has their two hands on the handler 56, they could not have one of their arms accidentally caught in the operating drilling machine 30 with its moving drill head 34. Therefore, the operation of drilling machine 30 is not stopped, but its speed may optionally be decreased (if it was optionally decreased).

Accordingly, as illustrated in FIG. 10, in case (d) if step 110 of the method determines that the entity is realizing a safe action, the flowchart changes the distribution of the subzones and goes to the same actions are is no entity is realizing the safe action, meaning that the organisation of the dimensions (or configuration) of the subzones 80 changes, but not the way the responsive actions are carried when an entity is detected within one of the subzones 80. Moreover, FIG. 10 further illustrates that step 110 may constantly be in operation and determines the position of the entity after step 112 to confirm whether the entity is still within cases (a) to (d). Also, although FIG. 10 does not illustrate an ending after an action is realised at step 112, it should be understood that steps 110 and 112 are carried out continuously, as long as an entity is detected within the detection area. It should also be noted that one the entity stops from realizing the safe action, the distribution of the subzones is reverted back to the first configuration mode.

As it can be appreciated from the above scenario, the method 100 allows a worker W to operate the machine 30 with the drill rod handler without interrupting it or optionally slowing it down, and without any threat for the worker W. This uninterrupted operation of machine 30 to add drill rods 32 to the drill string 31 and remove drill rod 32 from the drill string 31 means an important increase in productivity; and this also reduces the likelihood of accidental injuries on the site of the drilling machine 30 as the workers cannot get the drilling machine 30 to work without leaving the relevant high-ranking zones (e.g., subzone #1 80*a*) of the detection area, first.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while the specific embodiments have been illustrated and described, numerous modifications come to mind. The scope of the invention is therefore intended to be limited by the scope of the appended claims.

The invention claimed is:

1. A system for detecting an entity in a detection area surrounding at least partially a drilling machine, the detection area being divided into a plurality of subzones, each of said plurality of subzones being associated with a corresponding safety level, the system comprising:

at least one optical scanner optically covering the detection area and operable to capture the entity within the detection area;

a controlling device, operatively connected with the at least one optical scanner, the controlling device being configured to:

set up the system into a detection mode corresponding to the division of the detection area into the plurality of subzones with the corresponding associated safety levels;

determine a position of the entity captured by the at least one optical scanner within at least one of the plurality of subzones of the detection area; and trigger at least one action signal based on the safety level of the subzone corresponding to the determined position of the entity; and an authorized presence detection assembly configured to detect an authorized action realized by the entity in the vicinity of the drilling machine and operatively coupled to the controlling device;

wherein the controlling device is further configured to set up the system into an intervention mode different from the detection mode, when the authorized action is detected by the authorized presence detection assembly, and wherein the intervention mode corresponds to an intervention division of the detection area into a plurality of subzones different from the division of the detection area in the detection mode.

2. The system according to claim 1, wherein the detection area optically covered by the at least one optical scanner covers at least a peripheral region surrounding the drilling machine.

3. The system according to claim 1, wherein the at least one optical scanner covers the detection area from a support surface supporting the drilling machine to a height of at least one m.

4. The system according to claim 1, wherein the at least one optical scanner comprises at least three optical scanners, each optical scanner being configured to optically cover an area coverage portion of the detection area.

5. The system according to claim 4, wherein the area covering portion of each of the at least three optical scanners has a covering portion sector angle centered in or proximate the drilling machine.

6. The system according to claim 4, wherein said at least three optical scanners comprise first and second optical scanners, wherein the detection area further comprises at least a first overlapping area covered by the first and second optical scanners, wherein the first optical scanner covers a first covering portion of the detection area and the second optical scanner covers a second covering portion of the detection area, the second covering portion superposing at least partially the first covering portion so as to define therewith the first overlapping area.

7. The system according to claim 6, wherein said at least three optical scanners further comprise a third optical scanner, wherein the detection area further comprises a second overlapping area covered by the second and third optical scanners, wherein the third optical scanner covers a third covering portion of the detection area, the third covering portion superposing at least partially the second covering portion so as to define therewith the second overlapping area.

8. The system according to claim 1, wherein the at least one action signal comprises at least one of a drilling machine deceleration command, a drilling machine stop command, refraining from triggering a command to the drilling machine and a drilling machine start command, wherein the plurality of subzones comprises at least a first subzone corresponding to a high-risk zone, the drilling machine stop command is triggered when the entity is detected in the first subzone; a second subzone corresponding to a medium-risk zone, the drilling machine deceleration command is triggered when the entity is detected in the second subzone; and a third subzone corresponding to a low-risk zone.

9. The system according to claim 8, wherein the drilling machine is configurable upon reception of the at least one action signal into at least a normal configuration and a decelerated configuration, wherein a drilling rotational speed in the decelerated configuration is smaller than a drilling rotational speed in the normal configuration.

10. The system according to claim 1, wherein the detection area comprises an intervention sub-area and wherein the intervention sub-area when the system is in the intervention mode has a lower safety level than when the system is in the detection mode.

11. The system according to claim 10, wherein the detected entity is at least partially positioned within the intervention sub-area when manipulating the drill rod handler.

12. The system according to claim 1, wherein the authorized presence detection assembly comprises sensors configured to send a signal to the controlling device when the entity is realizing the authorized action.

13. The system according to claim 1, wherein the authorized action comprises the entity manipulating a drill rod handler in the vicinity of the drilling machine.

14. The system according to claim 1, wherein the entity captured by the at least one optical scanner is a first entity, wherein the controlling device is configured to send a drilling machine stop command to the drilling machine when at least a second entity is detected in at least one of the plurality of subzones of the detection area, even if the first entity is realizing the authorized action.

15. The system according to claim 1, further comprising a signalling device, operatively connected to the controlling device, the signalling device being configured to notify the presence of the detected entity in the detection area.

16. The system according to claim 15, wherein the signalling device is configured to send at least one notification signal when the entity is detected in the detection area, said at least one notification signal comprises at least one of an audio and visual signal, the at least one of an audio and visual signal being of a different level of intensity as a function of the subzone in which the entity is detected.

17. A system for detecting an entity in a detection area adjacent a drilling machine, the detection area being divided into a plurality of subzones, each of said plurality of subzones being associated with a corresponding safety level, the system comprising:

a detecting device optically covering the detection area and operable to capture the entity within the detection area;

a controlling device, operatively connected with the detecting device, the controlling device being configured to:

set up the system into a detection mode corresponding to the division of the detection area into the plurality of subzones with the corresponding associated safety levels;

determine a position of the entity captured by the detecting device within at least one of the plurality of subzones of the detection area; and trigger at least one action signal based on the safety level of the subzone corresponding to the determined position of the entity; and an authorized presence detection assembly configured to detect an authorized action realized by the entity in the vicinity of the drilling machine and operatively coupled to the controlling device;

wherein the controlling device is further configured to set up the system into an intervention mode different from the detection mode, when the authorized action is detected by the authorized presence detection assembly; and wherein the intervention mode corresponds to an intervention division of the detection area into a plurality of subzones different from the division of the detection area in the detection mode.

18. A method for detecting an entity in a detection area surrounding at least partially a drilling machine, the detection area being divided into a plurality of subzones, each of said plurality of subzones being associated with a corresponding safety level, the method comprising:

setting up the system into a detection mode corresponding to the division of the detection area into the plurality of subzones with the corresponding associated safety levels;

optically covering the detection area via at least one optical scanner;

capturing by the at least one optical scanner the entity within the detection area;

determining a position of the entity within at least one of the plurality of subzones of the detection area; and triggering at least one action signal based on the safety level of the subzone in which the entity is detected;

detecting an authorized action realized by the entity in the vicinity of the drilling machine with an authorized presence detection assembly; and setting up the system into an intervention mode different from the detection mode when the authorized action is detected by the authorized presence detection assembly, wherein the intervention mode corresponds to an intervention division of the detection area divided into a plurality of subzones different from the plurality of subzones of the division of the detection area in the detection mode.

* * * * *